United States Patent
Gilles et al.

(10) Patent No.: US 6,763,807 B1
(45) Date of Patent: *Jul. 20, 2004

(54) APPARATUS AND METHOD FOR CONTROLLING A FUEL INJECTOR ASSEMBLY OF AN INTERNAL COMBUSTION ENGINE DURING COLD OPERATION THEREOF

(75) Inventors: James C. Gilles, Piedmont, SC (US); Andrew Rockwell, East Peoria, IL (US)

(73) Assignee: Clean Fuel Technology, Inc., Reno, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,636

(22) Filed: Nov. 28, 1997

(51) Int. Cl.⁷ .................................................. F02M 7/00
(52) U.S. Cl. .................... 123/435; 123/198 F; 123/494
(58) Field of Search ................................ 123/436, 435, 123/198 F, 406, 27, 406.3, 179, 14, 481, 494

(56) References Cited

U.S. PATENT DOCUMENTS

| | | | |
|---|---|---|---|
| 4,148,282 A | * 4/1979 | Grassle ................. 123/179.17 |
| 4,932,379 A |   6/1990 | Tang et al. ................. 123/436 |
| 5,113,833 A | * 5/1992 | Nagano ................. 123/179.17 |
| 5,125,367 A | * 6/1992 | Ulrich ....................... 123/25 R |
| 5,146,882 A |   9/1992 | Brinkman et al. ........ 123/179.5 |
| 5,195,485 A |   3/1993 | Jensen et al. ............... 123/198 |
| 5,219,397 A |   6/1993 | Jones ....................... 123/179.3 |
| 5,433,182 A | * 7/1995 | Augustin ................ 123/198 F |
| 5,572,970 A |  11/1996 | Fukumura ............... 123/198 F |
| 5,579,737 A | *12/1996 | Tomisawa ................... 123/435 |
| 5,617,831 A | * 4/1997 | Shirakawa ............. 123/179.17 |
| 5,806,491 A | * 9/1998 | Ohtake ....................... 123/435 |
| 5,816,220 A | *10/1998 | Stumpp ...................... 123/435 |
| 5,819,701 A | *10/1998 | Morikawa ................... 123/435 |
| 5,826,563 A | *10/1998 | Patel ...................... 123/198 F |
| 6,185,928 B1 | * 2/2001 | Wallerand et al. ............ 60/274 |

* cited by examiner

Primary Examiner—Carl S. Miller
(74) Attorney, Agent, or Firm—Sierra Patent Group, Ltd.

(57) ABSTRACT

A method and apparatus for controlling a fuel injector assembly of an internal combustion engine during cold operation thereof is disclosed. If a combustion-absent condition is detected in one or more of the cylinders associated with the engine, an engine control module cuts out the affected cylinders thereby preventing additional fuel from being delivered to the cylinders for a predetermined period of time, such as 4–5 seconds. During the period of time in which the cylinders are cut out, the pistons in the remaining cylinders associated with the engine continue to operate thereby heating the engine block. After the predetermined period of time, fuel is again injected into the cylinders if a combustion-present condition is detected therein.

15 Claims, 4 Drawing Sheets

APPARATUS AND METHOD FOR CONTROLLING A FUEL INJECTOR ASSEMBLY OF AN INTERNAL COMBUSTION ENGINE DURING COLD OPERATION THEREOF

TECHNICAL FIELD OF THE INVENTION

The present invention relates generally to an internal combustion engine, and more particularly to an apparatus and method for controlling a fuel injector assembly of an internal combustion engine during cold operation thereof.

BACKGROUND OF THE INVENTION

During operation of an internal combustion engine, it is desirable to control the formation and emission of certain gases, such as the oxides of nitrogen ($NO_x$). One method of achieving this result is the use of water fuel emulsions. A water fuel emulsion is a certain type of mixture of a fuel, such as diesel fuel, and water. Additionally, a number of additives may also be included in the mixture to keep the fuel and water emulsified (i.e. the fuel and water form an emulsion). Use of such water fuel emulsions reduces the amount of $NO_x$ produced during operation of the internal combustion engine. In particular, $NO_x$ is produced when nitrogen and oxygen are combined at the high temperatures associated with combustion. Use of water fuel emulsions in lieu of standard diesel fuel reduces the combustion temperatures associated with the internal combustion engine thereby reducing $NO_x$ production during operation thereof.

However, use of water fuel emulsions has a number of drawbacks associated therewith. For example, during cold starting or cold running conditions, internal combustion engines fueled by water fuel emulsions may have a tendency to misfire in one or more of the engine's cylinders thereby producing undesirable smoke and exhaust odors. In particular, water fuel emulsions typically have lower cetane levels relative to standard diesel fuel. Such lower cetene levels may undesirably reduce the compression ignition quality of the internal combustion engine thereby potentially causing the engine to misfire during cold starting or cold running conditions. Such misfiring is typically reduced, if not completely eliminated, when the internal combustion engine reaches the normal operating temperature associated therewith.

What is needed therefore is an apparatus and method for controlling a fuel injector assembly of an internal combustion engine that is fueled by a water fuel emulsion which overcomes one or more of the above-mentioned drawbacks.

DISCLOSURE OF THE INVENTION

In accordance with a first embodiment of the present invention, there is provided a method of controlling a fuel injector assembly of an internal combustion engine. The internal combustion engine has a first cylinder. The fuel injector assembly has a fuel injector which is operatively associated with the first cylinder. The method includes the step of injecting fuel into the first cylinder with the fuel injector during a first engine cycle. The method further includes the step of sensing a combustion-absent condition in the first cylinder during the first engine cycle and generating a combustion-absent control signal in response thereto. The method also includes the step of preventing fuel from being injected into the first cylinder with the fuel injector during a second engine cycle if the combustion-absent control signal is generated in the combustion-absent sensing step.

In accordance with a second embodiment of the present invention, there is provided an apparatus for controlling a fuel injector assembly of an internal combustion engine. The apparatus includes a first cylinder, and a combustion sensor for sensing (i) a combustion-absent condition in the first cylinder, and (ii) a combustion-present condition in the first cylinder. The apparatus also includes an engine control module which (i) generates a combustion-absent control signal when the combustion sensor senses the combustion-absent condition in the first cylinder during a first engine cycle, and (ii) generates a combustion-present control signal when the combustion sensor senses the combustion-present condition in the first cylinder during the first engine cycle. The apparatus further includes a fuel injector which (i) injects fuel into the first cylinder during a second engine cycle in response to generation of the combustion-present control signal, and (ii) avoids injecting fuel into the first cylinder during the second engine cycle in response to generation of the combustion-absent control signal.

In accordance with a third embodiment of the present invention, there is provided a method of controlling a fuel injector assembly of an internal combustion engine. The internal combustion engine has a first cylinder. The fuel injector assembly has a fuel injector which is operatively associated with the first cylinder. The method includes the step of injecting fuel into the first cylinder with the fuel injector. The method also includes the step of sensing a combustion-absent condition in the first cylinder and generating a combustion-absent control signal in response thereto. The method further includes the step of preventing fuel from being injected into the first cylinder with the fuel injector for a predetermined period of time after generation of the combustion-absent control signal.

BEST MODE FOR CARRYING OUT THE INVENTION

Figure 1:
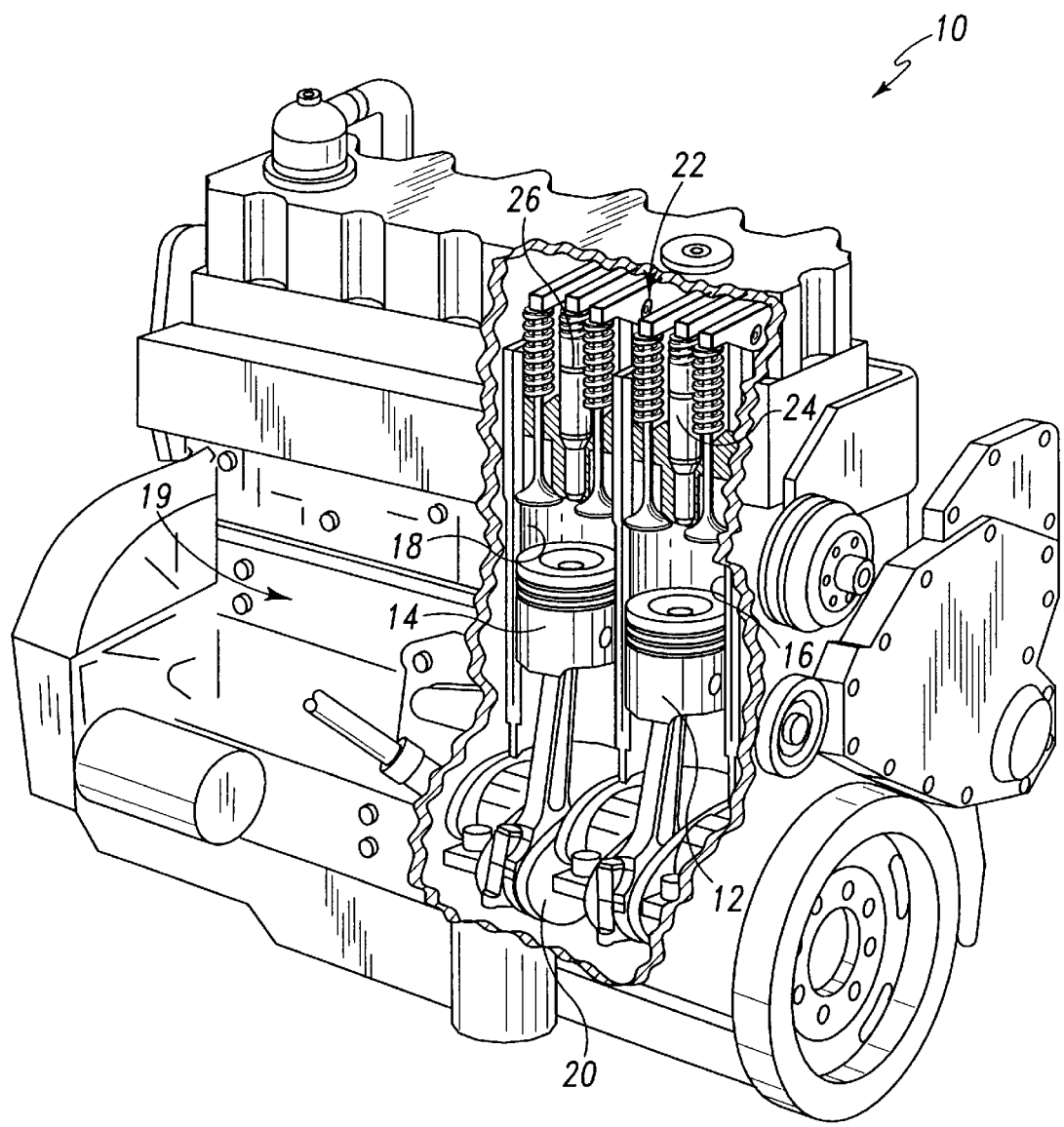
FIG. 1 is a fragmentary perspective view of an internal combustion engine which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
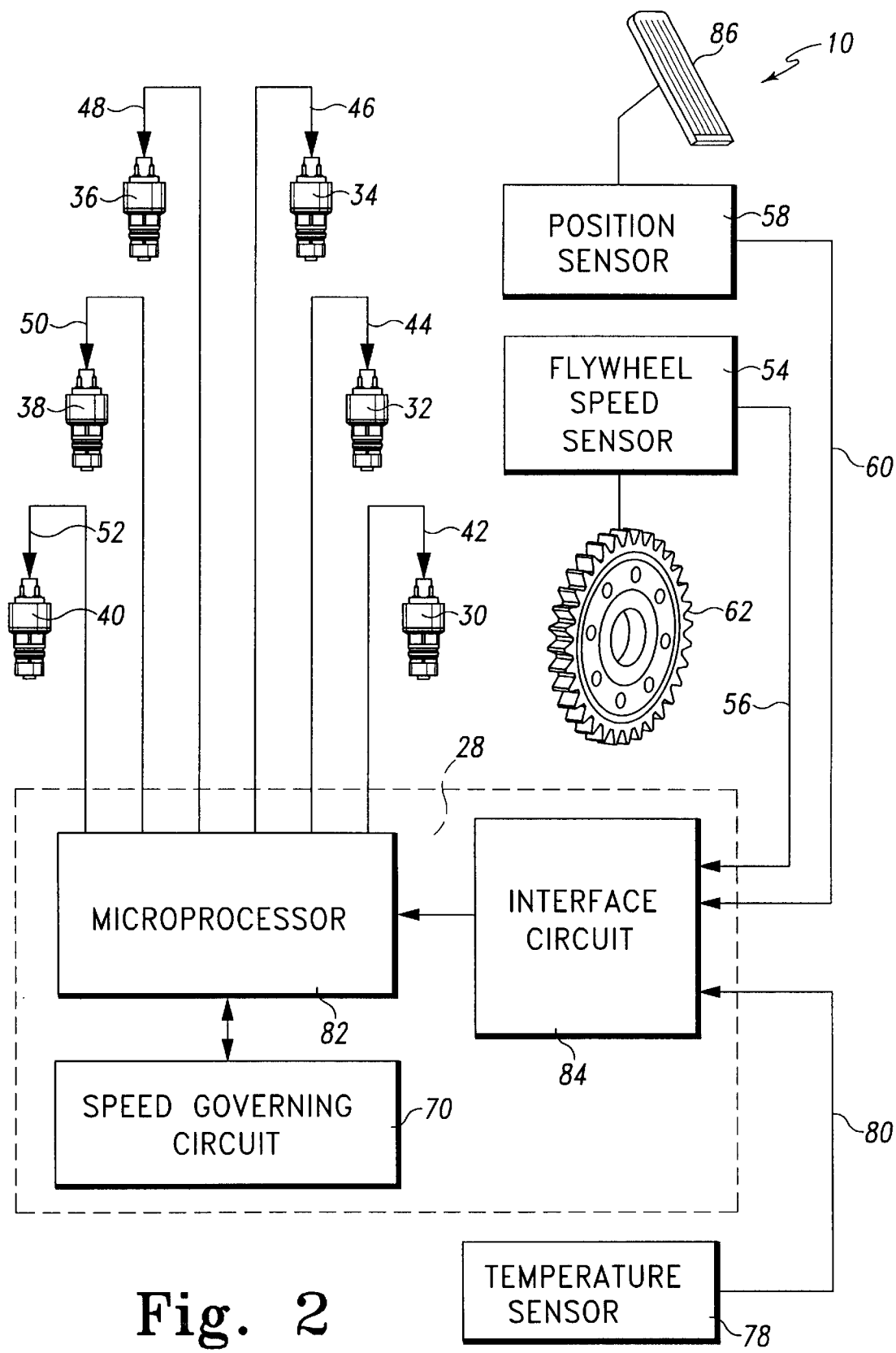
FIG. 2 is a schematic view of the internal combustion engine of FIG. 1.

Referring now to FIGS. 1 and 2, there is shown an internal combustion engine 10, such as a six-cylinder engine which is fueled by a water fuel emulsion. The internal combustion engine 10 includes a number of pistons 12, 14, and a crankshaft 20 operatively coupled to each of the pistons 12, 14. As shown in FIG. 1, the pistons 12, 14 are positioned in a number of cylinders 16, 18 defined in an engine block 19 of the internal combustion engine 10. It should be appreciated that although only two pistons (i.e. the pistons 12, 14) and two cylinders (i.e. the cylinders 16, 18) are shown in FIG. 1, the internal combustion engine 10 further includes four additional pistons which are respectively positioned in four additional cylinders which are not shown in FIG. 1 for clarity of description.

The internal combustion engine 10 further includes a fuel injector assembly 22 having a number of fuel injectors 24, 26 associated therewith. In particular, the fuel injector 24 is operatively associated with the cylinder 16, whereas the fuel injector 26 is operatively associated with the cylinder 18. The fuel injectors 24, 26 are electrically coupled to an engine control module 28 (see FIG. 2) in order to selectively inject fuel into the cylinders 16, 18. In particular, each of the fuel injectors associated with the fuel injector assembly 22 includes a respective solenoid 30, 32, 34, 36, 38, 40, as shown in FIG. 2. For example, the fuel injector 24 includes the solenoid 30, whereas the fuel injector 26 includes the solenoid 32. It should be appreciated that the remaining solenoids 34, 36, 38, 40 are associated with the remaining four fuel injectors (not shown) of the fuel injector assembly 22.

The solenoids 30, 32, 34, 36, 38, 40 are coupled to the engine control module 28 via a number of signal lines 42, 44, 46, 48, 50, 52, respectively. When the engine control module 28 generates an injection pulse on one of the signal lines 42, 44, 46, 35 48, 50, 52, the respective solenoid 30, 32, 34, 36, 38, 40 is actuated. It should be appreciated that actuation of one of the solenoids 30, 32, 34, 36, 38, 40 causes fuel to be injected into the engine cylinder associated therewith. For example, actuation of the solenoid 30 causes the fuel injector 24 to inject fuel into the cylinder 16. It should be further appreciated that the amount of fuel which is injected into the engine cylinder is proportional to the magnitude of the duration of the injection pulse. More specifically, as the duration of the injection pulse increases, the amount of fuel which is injected in to the cylinder likewise increases. Conversely, as the duration of the injection pulse decreases, the amount of fuel which is injected in to the cylinder likewise decreases.

The internal combustion engine 10 is a four stroke engine. The first stroke is an intake stroke in which air is advanced from an intake manifold (not shown) to one of the cylinders 16, 18. The engine 10 then advances to a compression stroke where the air is compressed in the cylinder 16, 18. At the end of the compression stroke, the engine control module 28 generates an output signal thereby actuating one of the solenoids 30, 32 which in turn causes the fuel injector 24, 26 to inject fuel into the cylinder 16, 18 thereby creating a fuel and air mixture in the cylinder 16, 18. Near the top of the compression stroke, the fuel and air mixture is ignited by the heat generated as a result of compressing the fuel and air mixture. Ignition of the fuel and air mixture advances the internal combustion engine 10 to a power stroke in which the fuel and air mixture is combusted and exhaust gases are formed. The combustion of the fuel and air mixture produces' energy which is converted to mechanical work by the pistons 12, 14, the crankshaft 20, and a flywheel 62 (see FIG. 2) which is operatively coupled to the crankshaft 20. Thereafter, the internal combustion engine 10 is advanced to an exhaust stroke in which exhaust gases are advanced from the cylinder 16, 18 to an exhaust manifold (not shown). Collectively, the intake stroke, compression stroke, power stroke, and exhaust stroke are included in one engine cycle of the internal combustion engine 10.

From the above discussion it should be appreciated that a combustion-present condition must exist in a particular engine cylinder (e.g. the cylinders 16, 18) in order for the piston (e.g. the pistons 12, 14, respectively) positioned therein to contribute to the overall mechanical work being generated by the internal combustion engine 10. What is meant herein by the term "combustion-present condition" is that the fuel injected into a given cylinder is actually ignited or otherwise combusted so as to generate motive power therefrom. For example, if a combustion-present condition exists in the cylinder 16 during a given engine cycle, the piston 12 is urged or otherwise moved so as to drive the crankshaft 20 due to combustion of the fuel in the cylinder 16 during the given engine cycle.

However, the piston 12 does not drive the crankshaft 20 if a combustion-absent condition is present in the cylinder 16. What is meant herein by the term "combustion-absent condition" is that the fuel, or a portion thereof, injected into a given cylinder is not ignited or otherwise combusted thereby producing little or no motive power therefrom. Hence, if a combustion-absent condition is present in the cylinder 16 during a particular engine cycle, the piston 12 will not drive the crankshaft 20 during the same engine cycle due to the lack of combustion of the fuel in the cylinder 16 during that particular engine cycle. However, the force being exerted on the crankshaft 20 by the other pistons associated with the internal combustion engine 10 (e.g. the piston 14) will continue to drive the crankshaft 20 thereby causing the piston 12 to translate within the cylinder 16.

The internal combustion engine 10 further includes a speed sensor 54 (see FIG. 2) operatively coupled to the flywheel 62. The speed sensor 54 communicates with the engine control module 28 via a signal line 56 in order to communicate data indicative of the rotational speed of the flywheel 62. It should be appreciated that rotational speed of the flywheel 62 is indicative of engine speed of the internal combustion engine 10. Moreover, it should further be appreciated that although the speed sensor 54 is herein described as being operatively coupled to the flywheel 62, and has numerous advantages thereby in the present invention, certain of these advantages may be achieved by operatively coupling the speed sensor 54 to any one of a number of other components associated with the internal combustion engine 10 in order to determine engine speed. For example, the speed sensor 54 may be operatively coupled to a camshaft (not shown) or any other component which is driven by, or mechanically coupled to, the crankshaft 20 in order to determine engine speed.

Moreover, the internal combustion engine 10 includes a position sensor 58. The position sensor 58 is operatively associated with an accelerator pedal 86, and communicates with the engine control module 28 via a signal line 60. Hence, when an operator pushes or otherwise urges the accelerator pedal 86 thereby indicating a desired increase in engine speed, the engine control module 28 receives a control signal indicative of a variable speed input value commensurate with the magnitude of the desired increase in engine speed from the position sensor 58. Similarly, when an operator releases the accelerator pedal 86 thereby indicating a desired decrease in engine speed, the engine control module 28 receives a control signal indicative of a variable speed input value commensurate with the magnitude of the desired decrease in engine speed from the position sensor 58. What is meant herein by the term "variable speed input value" is a speed input value generated by the position sensor 58 that is indicative of the position of the accelerator pedal 86.

The internal combustion engine 10 further includes a temperature sensor 78 (see FIG. 2). The temperature sensor 78 is secured to the engine block 19 in order to detect the temperature of the internal combustion engine 10 during operation thereof. It should be appreciated that the temperature sensor 78 may also be configured to detect temperature of fluid in a water jacket (not shown) associated with the internal combustion engine 10. The temperature of the fluid in the water jacket is indicative of the operating temperature of the internal combustion engine 10. The temperature sensor 78 is electrically coupled to the engine control module 28 via a signal line 80. Hence, output signals generated by the temperature sensor 78 which are indicative of the temperature of the internal combustion engine 10 are communicated to the engine control module 28 via the signal line 80.

The engine control module 28 includes a microprocessor 82 and an interface circuit 84. The interface circuit 84 converts the output signals from the speed sensor 54, the position sensor 58, and the temperature sensor 78 into a signal which is suitable for presentation to an input of the microprocessor 80. It should be appreciated that the interface circuit 84 may be embodied as a discrete device or number of devices, or may be integrated into the microprocessor 82.

In addition, the engine control module 28 includes a known speed governing circuit 70. The speed governing circuit 70 adjusts the duration of the injection pulses generated by the engine control module 28 in order to achieve or maintain a desired engine speed based on the magnitude of either (1) a variable speed input value from the position sensor 58, or (2) a preprogrammed speed input value. What is meant herein by the term "preprogrammed speed input value" is a speed input value that is preprogrammed which causes the engine control module 28 to operate the internal combustion engine 10 at a predetermined engine speed irrespective of the position of the position sensor 58. For example, when the temperature sensor 78 detects an engine temperature below a predetermined threshold, a temperature-insufficient control signal is generated which causes a preprogrammed speed input value to be used by the microprocessor 82 thereby causing the engine control module 28 to control the engine speed at a predetermined value, such as 1100 revolutions-per-minute, irrespective of the magnitude of the variable speed input value generated by the position sensor 58. It should be appreciated that controlling the engine speed at such a predetermined value (e.g. 1100 revolutions-per-minute) is desirable during cold starting conditions in order to quickly and efficiently increase the operating temperature of the internal combustion engine 10.

Hence, it should be appreciated that the speed governing circuit 70 adjusts the duration of subsequent injection pulses which are generated by the engine control module 28 and sent to each of the solenoids 30, 32, 34, 36, 38, 40 based on (1) the magnitude of the speed input value (either a variable speed input value or a preprogrammed speed input value), and (2) the rotational speed of the flywheel 62 (as detected by the speed sensor 54) thereby adjusting the engine speed of the internal combustion engine 10 to the desired engine speed. For example, if the position sensor 58 generates a control signal having a variable speed input value indicative of an engine speed increase, the speed governing circuit 70 increases the duration of subsequent injection pulses thereby causing the engine speed of the internal combustion engine 10 to increase. The speed governing circuit 70 then communicates with the speed sensor 54 in order to determine the rotational speed of the flywheel 62. The speed governing circuit 70 then alters the duration of subsequent injection pulses in order to produce a rotational speed on the flywheel 62 commensurate with the magnitude of the speed input value generated by the position sensor 58.

Similarly, if the engine control module is operating in a mode of operation such that a preprogrammed speed input value is utilized so as to maintain a predetermined, constant engine speed (e.g. a cold engine idle utilized during cold starting conditions), the speed governing circuit 70 increases or decreases the duration of subsequent injection pulses based on the magnitude of the output signals being generated by the flywheel speed sensor 54. The speed governing circuit 70 continues to monitor and adjust, if necessary, the duration of subsequent injection pulses in order to maintain the predetermined, constant rotational speed on the flywheel 62 commensurate with the magnitude of the preprogrammed speed input value.

The microprocessor 82 may selectively cut out one or more of the cylinders (e.g. the cylinders 16, 18) associated with the internal combustion engine 10. What is meant herein by the terms "cutting out" or "cut out" is that the engine control module 28 ceases generation of injection pulses on the signal line (e.g. the signal line 42) associated with one of the fuel injectors (e.g. the fuel injector 24) thereby preventing the fuel injector from injecting fuel into the cylinder (e.g. the cylinder 16) associated therewith. It should be appreciated that when fuel is not injected into the cylinder, a combustion-absent condition is created in the cylinder.

Such selective cutting out of the cylinders allows the engine control module 28 to detect a combustion-absent condition in any one of the cylinders. In particular, the engine control module 28 first utilizes a preprogrammed input speed value to operate the internal combustion engine 10 at a steady or constant engine speed (e.g. 1100 revolutions-per-minute) as described above. Once the internal combustion engine 10 is operating at a steady engine speed, the engine control module 28 cuts out one of the cylinders, for example the cylinder 16. After a predetermined period of time during which engine speed is stabilized, the microprocessor 82 monitors fluctuation or change in the duration of subsequent injection pulses. If the duration of subsequent injection pulses remains constant (as compared to the duration of injection pulses prior to cutting out the cylinder 16), the microprocessor 82 concludes that a combustion-absent condition existed in the cylinder 16 prior to the cutting out thereof. This would be true since cutting out the cylinder 16 apparently caused no change in rotational speed of the flywheel 62 since the speed governing circuit 70 did not alter the duration of subsequent injection pulses beyond a predetermined threshold thereby indicating that the piston 12 (in the case of the cylinder 16) was not driving the crankshaft and hence the flywheel 62 prior to when the cylinder 16 was cut out.

However, if the duration of subsequent injection pulses increases after cutting out the cylinder 16, the microprocessor 82 concludes that a combustion-present condition existed in the cylinder 16 prior to the cutting out thereof. This would be true since cutting out the cylinder 16 apparently caused rotational speed of the flywheel 62 to slow since the speed governing circuit 70 increased or otherwise altered the duration of subsequent injection pulses beyond the predetermined threshold thereby indicating that the piston 12 (in the case of the cylinder 16) was driving the crankshaft 20 and hence the flywheel 62 prior to when the cylinder 16 was cut out.

As alluded to above, the microprocessor 82 utilizes a preprogrammed speed input value in order to maintain a steady or constant engine speed during the period of time in which the microprocessor 82 determines the existence of a combustion-absent condition in each of the cylinders. In particular, the engine control module 28 operates the internal combustion engine 10 at a predetermined engine speed, such as 1100 revolutions-per-minute, irrespective of the magnitude of the variable input speed value from the position sensor 58 thereby allowing the microprocessor 82 to differentiate between changes in rotational speed of the flywheel 62 as a result of a combustion-absent condition in one of the cylinders (as described above) and changes in rotational speed of the flywheel 62 as a .result of varying input speed values from the position sensor 58 (i.e. manipulation of the accelerator pedal 86).

INDUSTRIAL APPLICABILITY

Figure 3:
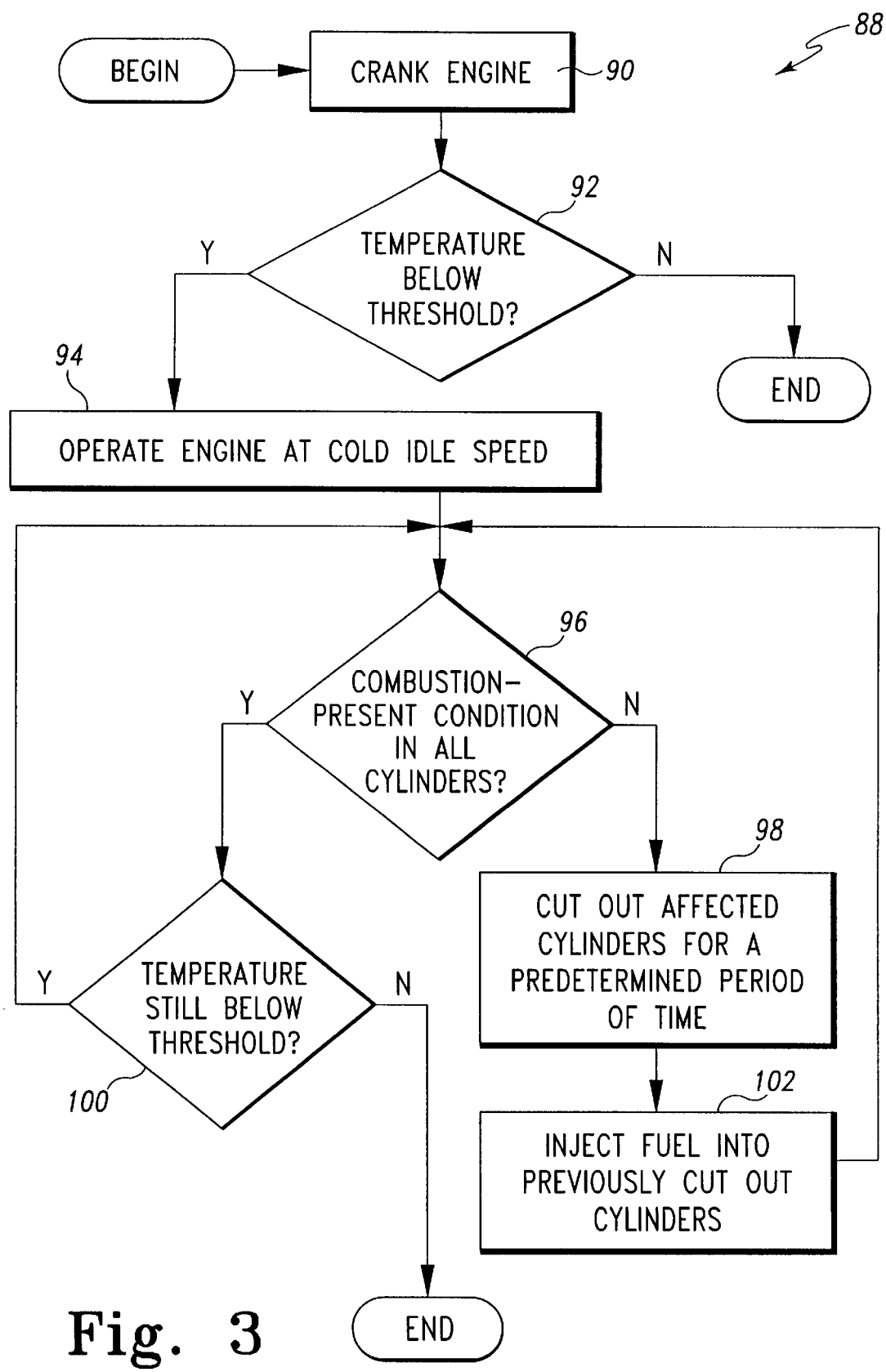
FIG. 3 is a flow chart setting forth a procedure for controlling the fuel injector assembly of the internal combustion engine of FIG. 1.

In operation, the engine control module 28 detects the existence of either a combustion-absent condition or a combustion-present condition in each of the cylinders and operates the fuel injector assembly 22 in a certain manner in order to reduce the emission of undesirable exhaust gases during cold starting of the internal combustion engine 10. A general procedure or routine 88 for controlling the fuel injector assembly 22 of the internal combustion engine 10 during cold starting thereof is shown in FIG. 3.

The routine 88 begins with step 90 in which the engine control module 28 causes the internal combustion engine 10 to be cranked or otherwise started in response to an operator's request. In particular, when the operator actuates an ignition switch (not shown) associated with the internal combustion engine 10, the engine control module 10 executes a number of instructions which cause the internal combustion engine 10 to crank or otherwise start in a known manner. However, it should be appreciated that the engine control module 28 may operate the fuel injector assembly 22 such that under certain starting conditions fuel is injected into only a predetermined number of cylinders during cranking of the internal combustion engine 10. For example, when the engine temperature is below a predetermined threshold, the engine control module 28 may inject fuel into only three of the six cylinders associated with the internal combustion engine 10 thereby reducing the emission of undesirable smoke and exhaust gases such as hydrocarbons and carbon monoxide during starting thereof. Thereafter; the routine 88 advances to step 92.

In step 92, the engine control module 28 determines if the engine temperature is below a predetermined threshold. In particular, the microprocessor 82 communicates with the temperature sensor 78 in order to determine the temperature of the internal combustion engine 10. If the temperature is below a predetermined threshold thereby indicating a cold starting or cold operating condition exists, a temperature-insufficient control signal is generated, and the routine 88 advances to step 94. If the temperature is above the predetermined threshold, a temperature sufficient control signal is generated, and the routine 88 then ends thereby placing the engine control module 28 in a mode of operation in which the engine control module 28 controls operation of the internal combustion engine 10 based on the magnitude of the variable speed input value from the position sensor 58 and/or any other input parameter associated with the engine control module 10.

In step 94, the engine control module 28 operates the internal combustion engine 10 at a predetermined, cold idle engine speed. In particular, the microprocessor 82 utilizes a preprogrammed speed input value in lieu of the variable sped input value from the position sensor 58. The use of a preprogrammed speed input value causes the speed governing circuit 70 to adjust the magnitude of subsequent injection pulses in order to maintain the engine speed at a cold idle speed, such as 1100 revolutions-per-minute. The routine 88 then advances to step 96.

In step 96, the engine control module 28 determines if combustion is present in each of the cylinders associated with the internal combustion engine 10 during a first engine cycle. In particular, the engine control module 28 first cuts out the cylinder 16. Thereafter, the microprocessor 82 monitors fluctuation or change in the duration of subsequent injection pulses. As discussed above, if the duration of subsequent injection pulses remains constant, the microprocessor 82 concludes that a combustion-absent condition existed in the cylinder 16 prior to the cutting out thereof. This would be true since cutting out the cylinder 16 apparently caused no change in rotational speed of the flywheel 62 since the speed governing circuit 70 did not alter the duration of subsequent injection pulses thereby indicating that the piston 12 was not driving the crankshaft 20 and hence the flywheel 62 prior to when the cylinder 16 was cut out.

However, if the duration of subsequent injection pulses increases after cutting out the cylinder 16, the microprocessor 82 concludes that a combustion-present condition existed in the cylinder 16 prior to the cutting out thereof. This would be true since cutting out the cylinder 16 apparently caused rotational speed of the flywheel 62 to slow since the speed governing circuit 70 increased or otherwise altered the duration of subsequent injection pulses thereby indicating that the piston 12 was driving the crankshaft 20 and hence the flywheel 62 prior to when the cylinder 16 was cut out.

The engine control module 28 then successively cuts out the cylinder 18 and thereafter the remaining cylinders associated with the internal combustion engine 10 in order to determine which cylinders, if any, have a combustion-absent condition existing therein. If a combustion-absent condition exists in any of the cylinders associated with the internal combustion engine 10, a combustion-absent control signal is generated and the routine 88 advances to step 98. If a combustion-present condition exists in all of the cylinders associated with the internal combustion engine 10, a combustion-present control signal is generated and the routine 88 advances to step 100.

In step 98, the engine control module 28 cuts out the cylinders having a combustion-absent condition existing therein for a predetermined period of time, such as 4–5 seconds. For example, if the engine control module 28 determined in step 96 that the cylinder 16 had a combustion-absent condition existing therein during a first engine cycle, the engine control module 28 will discontinue sending injection pulses to the solenoid 30 for 4–5 seconds starting with the next or second engine cycle in order to prevent fuel from being injected into the cylinder 16. By cutting out the cylinder 16, the engine control module 28 prevents fuel which would not be combusted from being injected into the cylinder 16 thereby reducing the emission of undesirable smoke and exhaust gases such as hydrocarbons and carbon monoxide. In particular, when a combustion-absent condition exists in the cylinder 16, raw, uncombusted fuel is exhausted therefrom during the exhaust stroke of the internal combustion engine 10 thereby increasing the emission of undesirable smoke and exhaust gases such as hydrocarbons and carbon monoxide. However, by preventing fuel from being injected into the cylinder 16, such emissions of raw, uncombusted fuel is reduced, if not eliminated.

It should be appreciated that during the period of time (e.g. 4–5 seconds) in which the cylinder 16 is cut out, the piston 12 does not drive the crankshaft 20. However, the pistons associated with cylinders having a combustion-present condition therein continue to drive the crankshaft 20 during such a period of time. For example, if a combustion-present condition was detected in the cylinder 18 during step 96, the piston 14 will continue to drive the crankshaft 20 during the period of time in which the cylinder 16 is cut out. Hence, the piston 12 continues to translate within the cylinder 16 even though the cylinder 16 is cut out. Such piston translation, along with heat generated by the existence of combustion-present conditions in a number of the other cylinders (e.g. the cylinder 18) associated with the internal combustion engine 10, heats or otherwise increases the temperature of the water jacket (not shown) and hence the engine block 19. As alluded to above, such an increase in temperature facilitates combustion of water emulsion fuels during subsequent engine cycles. After the predetermined period of time (e.g. 4–5 seconds), the routine 88 advances to step 102.

In step 102, the engine control module 28 causes fuel to be injected into the previously cut out cylinders. In particular, the microprocessor 82 generates an injection pulse which is sent to the respective solenoids 30, 32, 34, 36, 38, or 40 respectively associated with a previously cut out cylinder during the intake stroke of a subsequent or third engine cycle. For example, if the cylinder 16 was cut out in step 98, the microprocessor 82 generates an injection pulse on the signal line 42 thereby actuating the solenoid 30 which in turn causes fuel to be injected into the cylinder 16. The routine 88 then loops back to step 96 in order to determine if a combustion-absent condition still exists in any of the previously cut out cylinders, or any other cylinders, associated with the internal combustion engine 10.

Returning now to step 96, if a combustion-present condition exists in each of the cylinders associated with the internal combustion engine 10, the routine 88 then advances to step 100. In step 100, the engine control module 28 determines if the engine temperature is still below the predetermined threshold. In particular, the microprocessor 82 communicates with the temperature sensor 78 in order to determine the temperature of the internal combustion engine 10. If the temperature is still below the predetermined threshold, the microprocessor 82 concludes that the possibility remains for a combustion-absent condition to occur in one of the cylinders due to the cold temperature thereby causing the routine 88 to loop back to step 96 in order to verify that a combustion-present condition still exists in each of the cylinders. If the engine temperature is above the predetermined threshold, the routine 88 then ends thereby placing the engine control module 28 in a mode of operation in which the engine control module 28 controls operation of the internal combustion engine 10 based on the magnitude of the variable speed input value from the position sensor 58 and/or any other input parameter associated with the engine control module 10.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, in addition to monitoring the duration of subsequent injection pulses, the microprocessor 82 may also monitor a number of other operation parameters in order to determine the existence of a combustion-present condition or a combustion-absent condition in each of the cylinders associated with the internal combustion engine 10. For example, if the fuel injector assembly 22 is embodied as a known hydraulic-electronic unit injection system, the microprocessor 82 may monitor the magnitude of injection pressure generated by each of the fuel injectors after one of the cylinders has been cut out. It should be appreciated that in such an injection system, the injection pressure associated with each fuel injector may be increased in order to increase the amount of fuel which is injected into a given cylinder during a given injection pulse. Hence, if injection pressure is increased in one or more of the fuel injectors as a result of cutting out one of the cylinders, the microprocessor 82 may conclude that a combustion-present condition existed in the cylinder prior to the cutting out thereof.

Moreover, the microprocessor 82 may also monitor changes in the timing of subsequent injection pulses in order to determine the existence of a combustion-present condition or a combustion-absent condition in each of the cylinders associated with the internal combustion engine 10. For example, the engine control module may include a known timing advancing/retarding circuit (not shown) which selectively advances or retards the timing of subsequent injection pulses based upon operating parameters associated with the internal combustion engine 10. In particular, the timing advancing/retarding circuit may selectively advance or retard the timing of subsequent injection pulses based upon the engine load of the internal combustion engine 10. Hence, if the engine load changes as a result of cutting out one of the cylinders, the timing advancing/retarding circuit may adjust the timing of subsequent injection pulses thereby indicating the existence of a combustion-present condition in the cylinder prior to the cutting out thereof.

Figure 4:
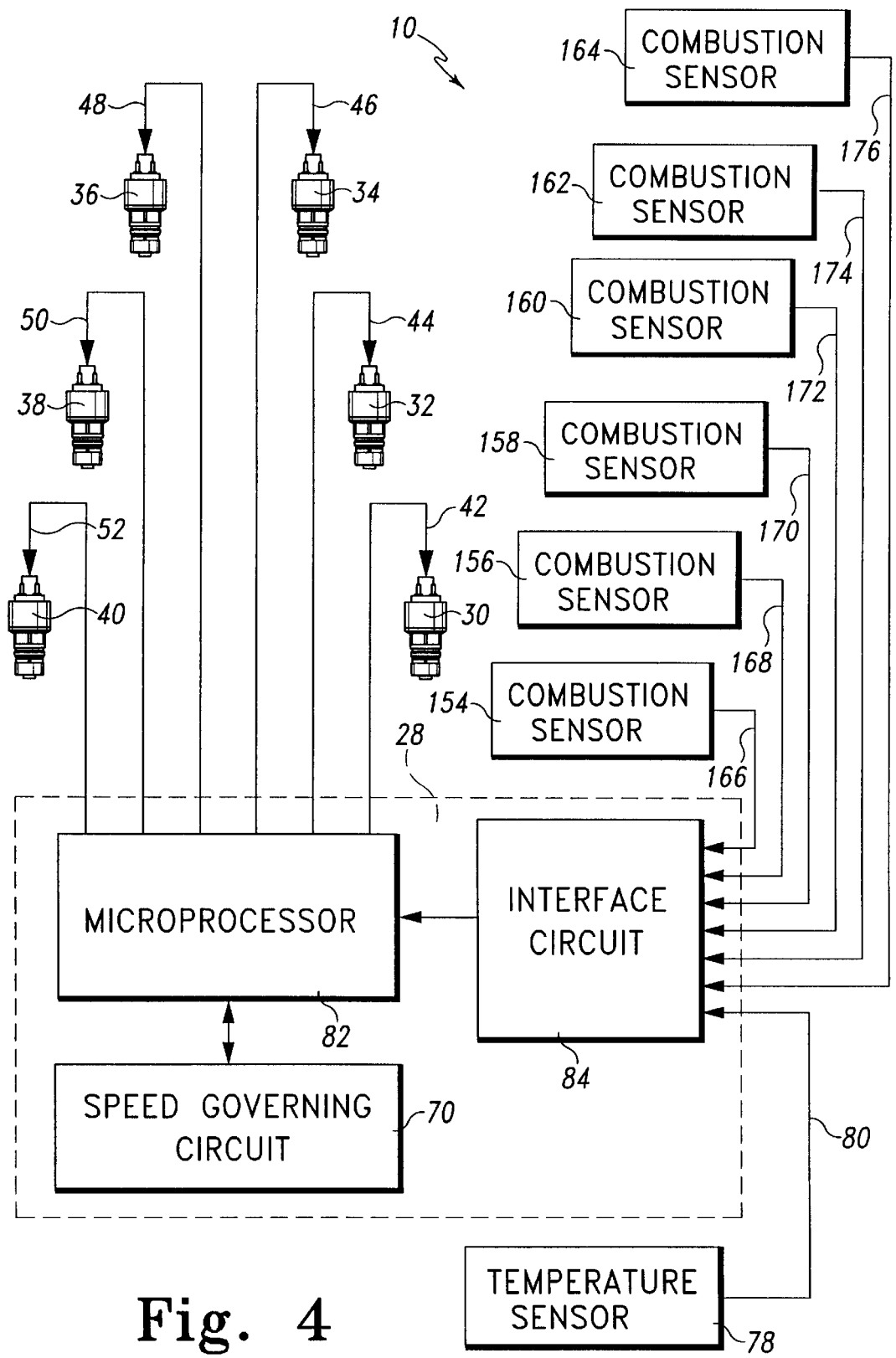
FIG. 4 is a schematic view similar to FIG. 2, but showing a number of combustion sensors electrically coupled to the engine control module.

Alternatively, as shown in FIG. 4, the internal combustion engine 10 may be configured to include a number of combustion sensors 154, 156, 158, 160, 162, 164. Each of the combustion sensors 154, 156, 158, 160, 162, 164 is coupled to the engine control module 28 via a number of signal lines 166, 168, 170, 172, 174, 176, respectively. The combustion sensors 154, 156, 158, 160, 162, 164 are positioned to sense or otherwise detect the presence of combustion in each of the respective cylinders associated with the internal combustion engine 10 during each power stroke of the pistons therein. For example, the combustion sensor 154 is positioned to sense the presence of combustion in the cylinder 16 during each power stroke of the piston 12, whereas the combustion sensor 156 is positioned to sense the presence of combustion in the cylinder 18 during each power stroke of the piston 14.

Various types of sensors are contemplated for use as the combustion sensors 154, 156, 158, 160, 162, 164 of the present invention. For example, the combustion sensors 154, 156, 158, 160, 162, 164 may be embodied as exhaust temperature sensors for sensing the temperature of the gases being exhausted through the exhaust valves of each of the cylinders of the internal combustion engine 10. Alternatively, the combustion sensors 154, 156, 158, 160, 162, 164 may be embodied as a number of accelerometers secured to the outside of the engine block 19 of the internal combustion engine 10. In such a configuration, the accelerometers may be used to detect movement of the engine block 19 which is indicative of the presence of combustion in the respective engine cylinders. Moreover, the combustion sensors 154, 156, 158, 160, 162, 164 may be embodied as a number of load cells secured to the outside of the engine block 19 of the internal combustion engine 10. In such a configuration, the load cells may be used to detect strain or other types of deflection of the engine block 19 which is indicative of the presence of combustion in the respective engine cylinders. Another type of known combustion sensor which is suitable for use in the present invention includes a number of noise or sound sensors positioned so as to detect the presence of the noise associated with combustion in each of the engine cylinders of the internal combustion engine 10.

The engine control module 28 communicates with the combustion sensors 154, 156, 158, 160, 162, 164 in order to determine if a combustion-present condition or a combustion-absent condition exists in each of the cylinders of the internal combustion engine 10 in lieu of monitoring fluctuations or changes to subsequent injection pulses by the speed governing circuit 70. It should be appreciated that by use of the combustion sensors 154, 156, 158, 160, 162, 164, the engine control module 28 may detect existence of a combustion-present condition or a combustion-absent condition in each of the cylinders during various operating conditions associated with the internal combustion engine 10. For example, use of the combustion sensors 154, 156, 158, 160, 162, 164, allows the engine control module 28 to detect existence of a combustion-present condition or a combustion-absent condition when engine speed is varying as a result of a variable speed input value from the position sensor 58. In particular, engine speed does not have to be maintained at a steady or constant speed (e.g. a cold idle speed) in order for the combustion sensors 154, 156, 158, 160, 162, 164 to detect the existence of a combustion-present condition or a combustion-absent condition thereby allowing the engine control module 28 to cut out a given cylinder at anytime during operation of the internal combustion engine 10 if a combustion-absent condition exists in the given cylinder. It should be appreciated that such a configuration is particularly useful when it is desirable to prevent fuel from being injected into the cylinder at periods of time other than cold starting or other idling conditions.

What is claimed is:

1. A method of controlling a fuel injector assembly of a four stroke internal combustion engine, with (i) the internal combustion engine having a first cylinder, (ii) the fuel injector assembly having a fuel injector, and (iii) the fuel injector being operatively associated with the first cylinder, comprising:

injecting fuel into the first cylinder with the fuel injector during a first engine cycle of the four stroke internal combustion engine, wherein the fuel includes a water emulsion diesel fuel;

sensing a combustion-absent condition in the first cylinder during the first engine cycle and generating a combustion-absent control signal in response thereto; and preventing fuel from being injected into the first cylinder with the fuel injector during a second engine cycle if the combustion-absent control signal is generated in the combustion-absent sensing step.

2. The method of claim 1, wherein (i) the internal combustion engine further has a second cylinder, a first piston, a second piston, and a crankshaft, (ii) the first piston is located within the first cylinder, (iii) the second piston is located with the second cylinder, and (iv) the crankshaft is operatively coupled to both the first piston and the second piston, further comprising:

driving the crankshaft with the second piston so as to cause the first piston to translate within the first cylinder during the preventing step.

3. The method of claim 1, further comprising:

injecting fuel into the first cylinder with the, fuel injector during a third engine cycle;

sensing a combustion-absent condition in the first cylinder during the third engine cycle and generating a combustion-present control signal in response thereto; and injecting fuel into the first cylinder with the fuel injector during a fourth engine cycle in response to generation of the combustion-present control signal.

4. The method of claim 1, wherein the preventing step includes the step of preventing fuel from being injected into the first cylinder with the fuel injector for a predetermined period of time after generation of the combustion-absent control signal.

5. The method of claim 1, wherein:

the first engine cycle includes a first intake stroke, a first compression stroke, a first power stroke, and a first exhaust stroke, and the sensing step includes the step of sensing the combustion-absent condition in the first cylinder during the first power stroke and generating the combustion-absent control signal in response thereto.

6. The method of claim 1, wherein:

the second engine cycle includes a second intake stroke, a second compression stroke, a second power stroke, and a second exhaust stroke, and the preventing step includes the step of preventing fuel from being injected into the first cylinder with the fuel injector during the second compression stroke in response to generation of the combustion-absent control signal.

7. The method of claim 1, wherein the internal combustion engine further has a temperature sensor positioned in thermal communication with an engine block thereof, further comprising:

sensing the temperature of the engine block with the temperature sensor and (i) generating a temperature-sufficient control signal if the temperature of the engine block exceeds a predetermined threshold, and (ii) generating a temperature-insufficient control signal if the temperature of the engine block does not exceed the predetermined threshold; and allowing fuel to be injected into the first cylinder with the fuel injector during a third engine cycle if the temperature-sufficient control signal is generated in the temperature sensing step.

8. The method of claim 7, further comprising:

preventing fuel from being injected into the first cylinder with the fuel injector during the third engine cycle if (i) the combustion-absent control signal is generated in the combustion sensing step, and (ii) the temperature-insufficient control signal is generated in the temperature sensing step.

9. The method of claim 1, wherein the first engine cycle and the second engine cycle are successive engine cycles.

10. An apparatus for controlling a fuel injector assembly of a four stroke internal combustion engine, comprising:

a first cylinder;

a combustion sensor for sensing (i) a combustion-absent condition in said first cylinder, and (ii) a combustion-present condition in said first cylinder;

an engine control module which (i) generates a combustion-absent control signal when said combustion sensor senses said combustion-absent condition in said first cylinder during a first engine cycle of the four stroke internal combustion engine, and (ii) generates a combustion-present control signal when said combustion sensor senses said combustion-present condition in said first cylinder during said first engine cycle; and a fuel injector which (i) injects fuel into said first cylinder during a second engine cycle in response to generation of said combustion-present control signal, and (ii) avoids injecting fuel into said first cylinder during said second engine cycle in response to generation of said combustion-absent control signal, said fuel includes a water emulsion diesel fuel.

11. The apparatus of claim 10, further comprising:

a second cylinder;

a first piston which is located within said first cylinder;

a second piston which is located within said second cylinder; and a crankshaft which is operatively coupled to both said first piston and said second piston, wherein (i) said crankshaft is driven with said second piston during said second engine cycle so as to cause said first piston to translate within said first cylinder when said engine control module generates said combustion-absent control signal.

12. The apparatus of claim 10, wherein said fuel injector avoids injecting fuel into said first cylinder for a predetermined period of time in response to generation of said combustion-absent control signal.

13. The apparatus of claim 10, wherein:

said first engine cycle of said internal combustion engine include a first intake stroke, a first compression stroke, a first power stroke, and a first exhaust stroke, said combustion sensor senses said combustion-absent condition in said first cylinder during said first power stroke, said second engine cycle of said internal combustion engine includes a second intake stroke, a second compression stroke, a second power stroke, and a second exhaust stroke, and said fuel injector avoids injecting fuel into said first cylinder during second intake stroke.

14. The apparatus of claim 10, wherein said first engine cycle and said second engine cycle are successive engine cycles.

15. The apparatus of claim 10, further comprising a temperature sensor positioned in thermal communication with an engine block of said internal combustion engine, wherein:

said engine control module is further electrically coupled to said temperature sensor, said engine control module generates (i) a temperature-sufficient control signal if the temperature of said engine block is above a temperature threshold, (ii) a temperature-insufficient control signal if the temperature of said engine block is below said temperature threshold, and said fuel injector injects fuel into said first cylinder during a third engine cycle of said internal combustion engine in response to generation of said temperature-sufficient control signal.

\* \* \* \* \*